(12) United States Patent
Woo

(10) Patent No.: US 11,749,819 B2
(45) Date of Patent: Sep. 5, 2023

(54) FUEL CELL SYSTEM AND EXHAUST GAS TREATMENT DEVICE

(71) Applicant: HYUNDAI MOBIS Co., Ltd., Seoul (KR)

(72) Inventor: Myeong Nam Woo, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 0 days.

(21) Appl. No.: 17/525,217

(22) Filed: Nov. 12, 2021

(65) Prior Publication Data
US 2023/0043105 A1    Feb. 9, 2023

(30) Foreign Application Priority Data
Aug. 9, 2021 (KR) .................. 10-2021-0104647

(51) Int. Cl.
*H01M 8/04119* (2016.01)
*H01M 8/04746* (2016.01)
(Continued)

(52) U.S. Cl.
CPC ... *H01M 8/04126* (2013.01); *H01M 8/04761* (2013.01); *H01M 8/04776* (2013.01);
(Continued)

(58) Field of Classification Search
CPC ......... H01M 8/04126; H01M 8/04761; H01M 8/04776; H01M 8/0662; H01M 8/04141; H01M 8/04089; H01M 8/04111; H01M 8/04225; H01M 8/04228; H01M 8/04231; H01M 8/04402; H01M 8/0441; H01M 8/04425; H01M 8/04462; H01M 8/0447; H01M 8/04514; H01M 8/04522;
(Continued)

(56) References Cited

U.S. PATENT DOCUMENTS

2006/0131531 A1* 6/2006 Ohmori ............. H01M 8/04156
251/129.15
2010/0151337 A1* 6/2010 Kanazawa ........ H01M 8/04126
261/105
(Continued)

FOREIGN PATENT DOCUMENTS

EP    3 336 944 A1    6/2018

OTHER PUBLICATIONS

Extended European Search Report issued in corresponding European Patent Application No. 21206993.4 dated Apr. 22, 2022.

*Primary Examiner* — Matthew W Van Oudenaren
(74) *Attorney, Agent, or Firm* — Morgan, Lewis & Bockius LLP

(57) ABSTRACT

The present disclosure relates to a fuel cell system including: an air supply line configured to supply air to a fuel cell stack; a discharge line connected to the fuel cell stack and configured to guide exhaust gas discharged from the fuel cell stack; a discharge adapter connected to the discharge line and configured to discharge the exhaust gas to the outside; and a bypass line having one end connected to the air supply line and the other end connected to the discharge adapter, the bypass line being configured to selectively allow the air to flow from the air supply line to the discharge adapter, thereby effectively reducing a hydrogen concentration in exhaust gas discharged from the fuel cell stack.

18 Claims, 7 Drawing Sheets

(51) Int. Cl.
  *H01M 8/0662* (2016.01)
  *H01M 8/04223* (2016.01)
(52) U.S. Cl.
  CPC ...... *H01M 8/0662* (2013.01); *H01M 8/04141* (2013.01); *H01M 8/04179* (2013.01); *H01M 8/04231* (2013.01); *H01M 2250/20* (2013.01)
(58) Field of Classification Search
  CPC ......... H01M 8/04805; H01M 2250/10; H01M 2250/20; H01M 8/04149; H01M 8/04843; H01M 8/04828
  See application file for complete search history.

(56) References Cited

U.S. PATENT DOCUMENTS

| | | | |
|---|---|---|---|
| 2016/0036073 A1* | 2/2016 | Kim | H01M 8/04291 429/414 |
| 2016/0344046 A1 | 11/2016 | Lee et al. | |
| 2017/0179509 A1* | 6/2017 | Jung | F16K 31/0693 |
| 2017/0263962 A1* | 9/2017 | Koo | H01M 8/0662 |
| 2017/0263963 A1 | 9/2017 | Seo et al. | |

\* cited by examiner

FUEL CELL SYSTEM AND EXHAUST GAS TREATMENT DEVICE

CROSS-REFERENCE TO RELATED APPLICATION

This application claims priority to and the benefit of Korean Patent Application No. 10-2021-0104647 filed in the Korean Intellectual Property Office on Aug. 9, 2021, the entire contents of which are incorporated herein by reference.

TECHNICAL FIELD

The present disclosure relates to a fuel cell system and an exhaust gas treatment device, and more particularly, to a fuel cell system and an exhaust gas treatment device that are capable of reducing a hydrogen concentration in exhaust gas discharged from a fuel cell stack.

BACKGROUND ART

A fuel cell vehicle (e.g., a hydrogen fuel cell vehicle) is configured to autonomously generate electricity by means of a chemical reaction between fuel (hydrogen) and air (oxygen) and travel by operating a motor.

In general, the fuel cell vehicle includes a fuel cell stack configured to generate electricity by means of an oxidation-reduction reaction between hydrogen and oxygen, a fuel supply device configured to supply fuel (hydrogen) to the fuel cell stack, an air supply device configured to supply the fuel cell stack with air (oxygen) which is an oxidant required for an electrochemical reaction, and a thermal management system (TMS) configured to remove heat, which is generated from the fuel cell stack and power electronic parts of the vehicle, to the outside of the system and control temperatures of the fuel cell stack and the power electronic parts.

Further, discharge water (condensate water) and exhaust gas (e.g., unreacted hydrogen), which are produced during the operation of the fuel cell stack, may be discharged to the outside through an exhaust pipe.

Recently, various attempts have been made to apply the fuel cell system to construction machines (e.g., excavators) as well as passenger vehicles (or commercial vehicles).

Meanwhile, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Accordingly, regulations are defined to force the hydrogen concentration in the exhaust gas discharged from the fuel cell to be at a predetermined level or lower.

The passenger vehicle operates mainly for the purpose of traveling, and it is possible to dilute the exhaust gas (reduce the hydrogen concentration in the exhaust gas) using outside air introduced into the vehicle while the vehicle travels (using vehicle-induced wind introduced when the vehicle travels).

In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position (e.g., in a power pack), which causes an increase in the risk of occurrence of an accident (risk of explosion).

Therefore, recently, various studies have been conducted to effectively reduce a hydrogen concentration in the exhaust gas discharged from the fuel cell stack, but the study results are still insufficient. Accordingly, there is a need to develop a technology to effectively reduce the hydrogen concentration in the exhaust gas discharged from the fuel cell stack.

SUMMARY

The present disclosure has been made in an effort to provide a fuel cell system and an exhaust gas treatment device that are capable of reducing a hydrogen concentration in exhaust gas discharged from a fuel cell stack.

In particular, the present disclosure has been made in an effort to reduce a hydrogen concentration in exhaust gas discharged from a fuel cell stack even under a condition in which vehicle-induced wind cannot be used.

The present disclosure has also been made in an effort to simplify a structure and improve spatial utilization and a degree of design freedom.

The present disclosure has also been made in an effort to improve safety and reliability.

The present disclosure has also been made in an effort to simplify a manufacturing process and reduce costs.

The objects to be achieved by the embodiments are not limited to the above-mentioned objects, but also include objects or effects that may be understood from the solutions or embodiments described below.

An exemplary embodiment of the present disclosure provides a fuel cell system including: an air supply line configured to supply air to a fuel cell stack; a discharge line connected to the fuel cell stack and configured to guide exhaust gas discharged from the fuel cell stack; a discharge adapter connected to the discharge line and configured to discharge the exhaust gas to the outside; and a bypass line having one end connected to the air supply line and the other end connected to the discharge adapter, the bypass line being configured to selectively allow the air to flow from the air supply line to the discharge adapter.

This is to reduce the hydrogen concentration in the exhaust gas discharged from the fuel cell stack.

That is, hydrogen may be contained in the exhaust gas discharged from the fuel cell stack (e.g., the exhaust gas discharged during a purge process for adjusting a hydrogen concentration in the fuel cell stack). When a hydrogen concentration in the exhaust gas increases to a certain level or higher, the risk of explosion increases. Therefore, the hydrogen concentration in the exhaust gas discharged from the fuel cell needs to be maintained at a predetermined level or lower.

The passenger vehicle operates mainly for the purpose of traveling, and it is possible to dilute the exhaust gas using outside air introduced into the vehicle while the vehicle travels (using vehicle-induced wind introduced when the vehicle travels). In contrast, in the case of the construction machine used in a stationary state in an indoor construction site such as a construction site in a factory or warehouse, it is difficult to use the vehicle-induced wind, which makes it difficult to sufficiently dilute the exhaust gas. In particular, the exhaust gas stagnates at a particular position, which causes an increase in the risk of occurrence of an accident (risk of explosion).

However, according to the embodiment of the present disclosure, a part of the air, which is supplied to the fuel cell stack through the air supply line, is supplied to the discharge adapter configured to discharge the exhaust gas, such that the discharge adapter may discharge the exhaust gas and the air together. Therefore, it is possible to obtain an advantageous effect of reducing a hydrogen concentration in the exhaust gas discharged to the outlet of the discharge line even under a condition in which vehicle-induced wind cannot be used.

Among other things, according to the embodiment of the present disclosure, the exhaust gas (hydrogen) and the air are mixed by the discharge adapter. Therefore, it is possible to obtain an advantageous effect of reducing the hydrogen concentration of the exhaust gas and reducing the risk of explosion.

Moreover, according to the embodiment of the present disclosure, it is not necessary to additionally provide a separate fan (an air supply fan) for forcibly supplying the air to reduce the hydrogen concentration in the exhaust gas discharged from the fuel cell. Therefore, it is possible to obtain an advantageous effect of simplifying the structure and improving the degree of design freedom and the spatial utilization.

According to the exemplary embodiment of the present disclosure, the fuel cell system may include an air compressor connected to the air supply line and configured to compress the air to be supplied to the fuel cell stack.

The discharge adapter may have various structures capable of discharging the air and the exhaust gas together.

According to the exemplary embodiment of the present disclosure, the discharge adapter may include: an adapter body having a discharge flow path communicating with the discharge line; an air inlet port provided in the adapter body and connected to the bypass line; and an adapter guide disposed on the adapter body and configured to define an air injection flow path separated from the discharge flow path and communicating with the air inlet port.

According to the exemplary embodiment of the present disclosure, the fuel cell system may include a valve unit connected to the discharge line and configured to selectively open or close the discharge line, and the discharge adapter may be connected to the valve unit.

The valve unit may have various structures capable of selectively opening or closing the discharge line. For example, the valve unit may include: a valve housing having a valve flow path communicating with the discharge line; and a valve member configured to selectively open or close the valve flow path.

According to the exemplary embodiment of the present disclosure, the adapter guide may be provided in the form of a continuous ring in a circumferential direction of the adapter body, and the air injection flow path may be provided in the form of a continuous ring in the circumferential direction of the adapter body.

In particular, an outlet of the discharge flow path and an outlet of the air injection flow path may be directed in the same direction.

According to the exemplary embodiment of the present disclosure, an inlet of the air inlet port may have a first cross-sectional area, and an outlet of the air injection flow path may have a second cross-sectional area smaller than the first cross-sectional area.

As described above, according to the embodiment of the present disclosure, the cross-sectional area of the outlet of the air injection flow path is smaller than the cross-sectional area of the inlet of the air inlet port. Therefore, a discharge velocity of the air discharged through the air injection flow path may be higher than an inflow velocity of the air introduced into the air inlet port. As a result, a pressure in the outlet region of the air injection flow path may be lower than a pressure in the valve flow path.

As a result, a pressure difference between the external pressure (the pressure in the outlet region of the air injection flow path) and the internal pressure (the internal pressure of the valve flow path) enables air adjacent to the periphery of the outlet of the air injection flow path to enter (move to) the outlet region of the air injection flow path where the pressure is relatively low. Therefore, the air injected through the air injection flow path and the air adjacent to the periphery of the outlet of the air injection flow path may be mixed in the exhaust gas discharged through the discharge flow path. Therefore, it is possible to obtain an advantageous effect of more effectively reducing the hydrogen concentration in the exhaust gas.

In particular, the air injection flow path may have a cross-sectional area that gradually decreases from an inlet end to an outlet end of the air injection flow path.

Since the air injection flow path has a cross-sectional area that gradually decreases from the inlet end to the outlet end as described above, the velocity (flow velocity) of the air passing through the air injection flow path may further increase. Therefore, it is possible to further increase the discharge velocity of the air discharged through the air injection flow path.

More particularly, the air injection flow path may have a streamlined cross-sectional shape.

As described above, according to the embodiment of the present disclosure, the air injection flow path has a streamlined cross-sectional shape having a cross-sectional area that gradually decreases from the inlet end to the outlet end. Therefore, the velocity of the air passing through the air injection flow path may gradually increase, and the pressure in the outlet region of the air injection flow path may more effectively decrease. As a result, it is possible to obtain an advantageous effect of maximizing the inflow amount of air to be introduced into the exhaust gas at the periphery of the outlet of the air injection flow path.

According to the exemplary embodiment of the present disclosure, the fuel cell system may include an inlet hole provided in the adapter body and configured to communicate with the discharge flow path and allow air outside the adapter body to be introduced thereinto.

As described above, according to the embodiment of the present disclosure, the inlet holes are provided in the adapter body, and the air outside the adapter body is introduced into the adapter body (the discharge flow path) through the inlet holes. Therefore, it is possible to obtain an advantageous effect of more effectively reducing the hydrogen concentration in the exhaust gas discharged through the discharge flow path.

In particular, the inlet hole may be provided in plural, and the plurality of inlet holes may be spaced apart from one another in a circumferential direction of the adapter body. Since the plurality of inlet holes is spaced apart from one another at uniform intervals in the circumferential direction of the adapter body as described above, the air may be uniformly introduced into the adapter body in the circumferential direction of the adapter body. Therefore, it is possible to obtain an advantageous effect of further improving efficiency in mixing the exhaust gas and the air.

According to the exemplary embodiment of the present disclosure, the fuel cell system may include a sealing member interposed between the valve housing and the discharge adapter.

Since the sealing member is provided between the valve housing and the discharge adapter as described above, it is possible to obtain an advantageous effect of minimizing leakage of the exhaust gas through the gap between the valve housing and the discharge adapter and improving safety and reliability.

According to the exemplary embodiment of the present disclosure, the fuel cell system may include: a fastening flap extending from an end of the discharge adapter and disposed to surround an outer peripheral surface of an outlet port of the valve housing; and a clamp member configured to lock the fastening flap to the outlet port.

In particular, according to the exemplary embodiment of the present disclosure, the fuel cell system may include a cut-out slit provided in the fastening flap. As described above, according to the embodiment of the present disclosure, the cut-out slit is provided in the fastening flap. Therefore, the cut-out slit may improve dynamic properties of the fastening flap relative to the discharge adapter (the properties that enable the fastening flap to move relative to the discharge adapter in the radial direction of the discharge adapter based on one end of the fastening flap connected to the discharge adapter).

According to the exemplary embodiment of the present disclosure, the fuel cell system may include: a catching protrusion provided on the outer peripheral surface of the outlet port; and a catching groove provided in an inner peripheral surface of the fastening flap and configured to accommodate the catching protrusion.

The catching protrusion provided on the outer peripheral surface of the outlet port is accommodated in the catching groove provided in the inner peripheral surface of the fastening flap when the fastening flap is disposed to surround the outer peripheral surface of the outlet port of the valve housing as described above. Therefore, it is possible to obtain an advantageous effect of stably maintaining an assembled state of the fastening flap and inhibiting the discharge adapter from separating from the valve housing.

Another exemplary embodiment of the present disclosure provides an exhaust gas treatment device including: a valve unit disposed in a discharge line for discharging exhaust gas discharged from a fuel cell stack and configured to selectively open or close the discharge line; and a discharge adapter connected to the valve unit and configured to discharge, to the outside, the exhaust gas together with air to be supplied to the fuel cell stack.

According to the exemplary embodiment of the present disclosure, the valve unit may include: a valve housing having a valve flow path communicating with the discharge line; and a valve member configured to selectively open or close the valve flow path.

According to the exemplary embodiment of the present disclosure, the discharge adapter may include: an adapter body having a discharge flow path communicating with the valve flow path; an air inlet port provided in the adapter body and configured to allow the air to be introduced thereinto; and an adapter guide disposed on the adapter body and configured to define an air injection flow path separated from the discharge flow path and communicating with the air inlet port.

According to the exemplary embodiment of the present disclosure, the exhaust gas treatment device may include: an inlet hole provided in the adapter body and configured to communicate with the discharge flow path and allow air outside the adapter body to be introduced thereinto.

According to the embodiment of the present disclosure described above, it is possible to obtain an advantageous effect of reducing a hydrogen concentration in the exhaust gas discharged from the fuel cell stack.

In particular, according to the embodiment of the present disclosure, it is possible to obtain an advantageous effect of reducing the hydrogen concentration in the exhaust gas discharged from the fuel cell stack even under the condition in which the vehicle-induced wind cannot be used.

In addition, according to the embodiment of the present disclosure, it is possible to obtain an advantageous effect of simplifying the structure and improving the spatial utilization and the degree of design freedom.

In addition, according to the embodiment of the present disclosure, it is possible to obtain an advantageous effect of improving safety and reliability.

In addition, according to the embodiment of the present disclosure, it is possible to obtain an advantageous effect of simplifying the manufacturing process and reducing the costs.

DETAILED DESCRIPTION

Figure 1:
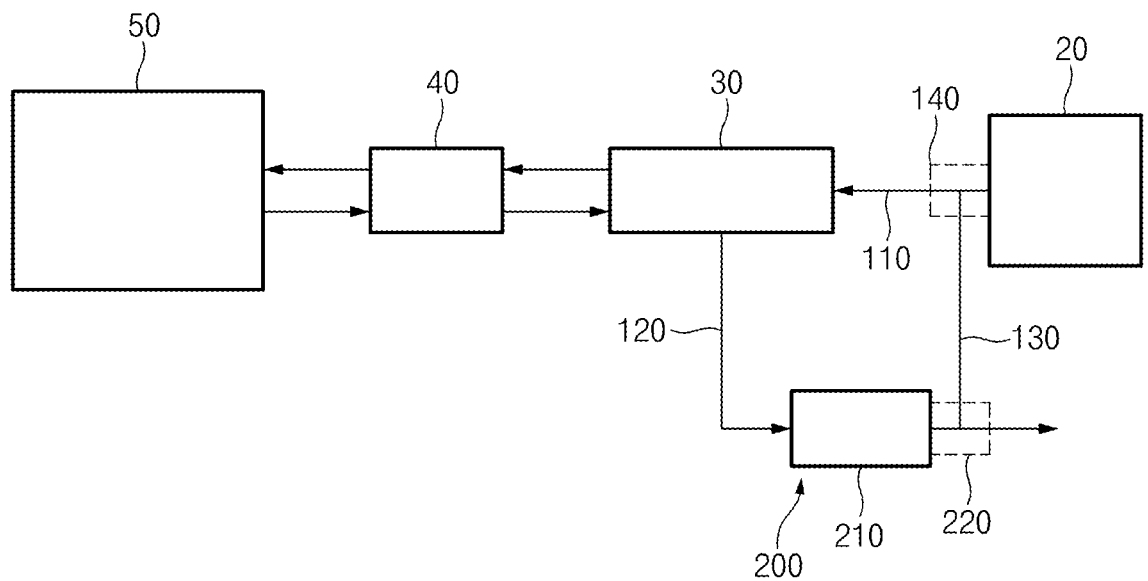
FIG. 1 is a view for explaining a fuel cell system according to an embodiment of the present disclosure.

Hereinafter, exemplary embodiments of the present disclosure will be described in detail with reference to the accompanying drawings.

However, the technical spirit of the present disclosure is not limited to some embodiments described herein but may be implemented in various different forms. One or more of the constituent elements in the embodiments may be selectively combined and substituted for use within the scope of the technical spirit of the present disclosure.

In addition, unless otherwise specifically and explicitly defined and stated, the terms (including technical and scientific terms) used in the embodiments of the present disclosure may be construed as the meaning which may be commonly understood by the person with ordinary skill in the art to which the present disclosure pertains. The meanings of the commonly used terms such as the terms defined in dictionaries may be interpreted in consideration of the contextual meanings of the related technology.

In addition, the terms used in the embodiments of the present disclosure are for explaining the embodiments, not for limiting the present disclosure.

In the present specification, unless particularly stated otherwise, a singular form may also include a plural form. The expression "at least one (or one or more) of A, B, and C" may include one or more of all combinations that can be made by combining A, B, and C.

In addition, the terms such as first, second, A, B, (a), and (b) may be used to describe constituent elements of the embodiments of the present disclosure.

These terms are used only for the purpose of discriminating one constituent element from another constituent element, and the nature, the sequences, or the orders of the constituent elements are not limited by the terms.

Further, when one constituent element is described as being 'connected', 'coupled', or 'attached' to another constituent element, one constituent element may be connected, coupled, or attached directly to another constituent element or connected, coupled, or attached to another constituent element through still another constituent element interposed therebetween.

In addition, the expression "one constituent element is provided or disposed above (on) or below (under) another constituent element" includes not only a case in which the two constituent elements are in direct contact with each other, but also a case in which one or more other constituent elements are provided or disposed between the two constituent elements. The expression "above (on) or below (under)" may mean a downward direction as well as an upward direction based on one constituent element.

Referring to FIGS. 1 to 7, an exhaust gas treatment device 200 according to an embodiment of the present disclosure includes: a valve unit 210 disposed in a discharge line 120 through which exhaust gas EG discharged from a fuel cell stack is discharged, the valve unit 210 being configured to selectively open or close the discharge line 120; and a discharge adapter 220 connected to the valve unit 210 and configured to discharge, to the outside, the exhaust gas EG together with air AG1 supplied to the fuel cell stack.

For reference, the exhaust gas treatment device 200 according to the embodiment of the present disclosure may be applied to treat the exhaust gas EG discharged from a fuel cell system 10 applied to mobility vehicles such as automobiles, ships, and airplanes. The present disclosure is not restricted or limited by types and properties of subjects (mobility vehicles) to which the exhaust gas treatment device 200 is applied.

Hereinafter, an example will be described in which the exhaust gas treatment device 200 according to the embodiment of the present disclosure is applied to the fuel cell system 10 provided in a construction machine (e.g., an excavator).

According to the exemplary embodiment of the present disclosure, the fuel cell system 10 includes: an air supply line 110 configured to supply the air to the fuel cell stack; the discharge line 120 connected to the fuel cell stack and configured to guide the exhaust gas EG discharged from the fuel cell stack; the discharge adapter 220 connected to the discharge line 120 and configured to discharge the exhaust gas EG to the outside; and a bypass line 130 having one end connected to the air supply line 110 and the other end connected to the discharge adapter 220, the bypass line 130 being configured to selectively allow the air AG1 to flow from the air supply line 110 to the discharge adapter 220.

The air supply line 110 is connected to a fuel cell stack 50 to supply the air to the fuel cell stack 50.

The air supply line 110 may have various structures capable of supplying the air to the fuel cell stack 50. The present disclosure is not restricted or limited by the structure of the air supply line 110.

Figure 2:
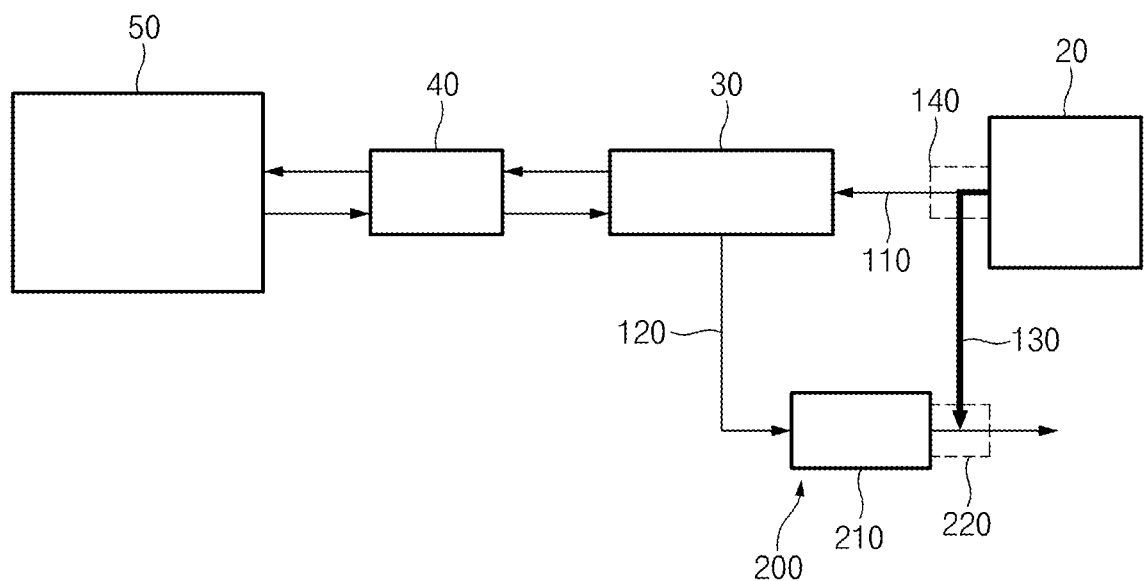
FIG. 2 is a view for explaining a flow path of air along a bypass line in the fuel cell system according to the embodiment of the present disclosure.
Figure 3:
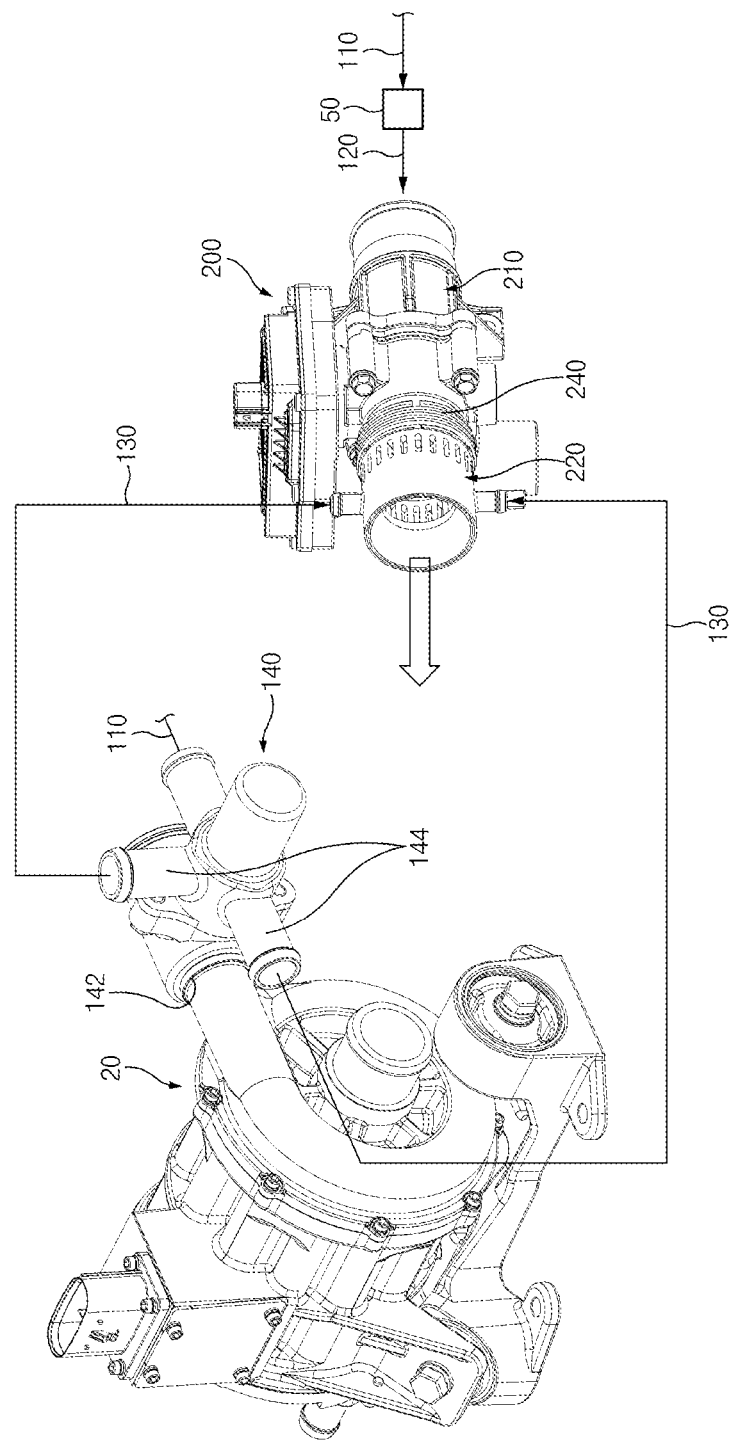
FIG. 3 is a view for explaining a supply adapter of the fuel cell system according to the embodiment of the present disclosure.

Referring to FIGS. 1 to 3, according to the exemplary embodiment of the present disclosure, the fuel cell system 10 may include an air compressor 20 connected to the air supply line 110 and configured to compress the air to be supplied to the fuel cell stack 50.

The air compressor 20 compresses the air supplied through the air supply line 110 and supplies the air to the fuel cell stack 50.

More specifically, the air compressor 20 may compress the air so that the air to be supplied to the fuel cell stack 50 may have a sufficient pressure that enables the air to pass through a flow path in the fuel cell stack 50.

Various air compressors 20 capable of compressing air may be used as the air compressor 20. The present disclosure is not restricted or limited by the type and structure of the air compressor 20. For example, the air compressor 20 may be configured to compress and supply the air using a centrifugal force generated by a rotation of a rotor (not illustrated).

For reference, the fuel cell stack 50 refers to a kind of power generation device that generates electrical energy through a chemical reaction of fuel (e.g., hydrogen), and the fuel cell stack may be configured by stacking several tens or hundreds of fuel cells (unit cells) in series.

The fuel cell may have various structures capable of producing electricity by means of an oxidation-reduction reaction between fuel (e.g., hydrogen) and an oxidant (e.g., air).

For example, the fuel cell may include: a membrane electrode assembly (MEA) (not illustrated) having catalyst electrode layers in which electrochemical reactions occur and which is attached to two opposite sides of an electrolyte membrane through which hydrogen ions move; a gas diffusion layer (GDL) (not illustrated) configured to uniformly distribute reactant gases and transfer generated electrical energy; a gasket (not illustrated) and a fastener (not illustrated) configured to maintain leakproof sealability for the reactant gases and a coolant and maintain an appropriate fastening pressure; and a separator (bipolar plate) (not illustrated) configured to move the reactant gases and the coolant.

More specifically, in the fuel cell, hydrogen, which is fuel, and air (oxygen), which is an oxidant, are supplied to an anode and a cathode of the membrane electrode assembly, respectively, through flow paths in the separator, such that the hydrogen is supplied to the anode, and the air is supplied to the cathode.

The hydrogen supplied to the anode is decomposed into hydrogen ions (protons) and electrons by catalysts in the electrode layers provided at two opposite sides of the electrolyte membrane. Only the hydrogen ions are selectively transmitted to the cathode through the electrolyte membrane, which is a cation exchange membrane, and at the same time, the electrons are transmitted to the cathode through the gas diffusion layer and the separator which are conductors.

At the cathode, the hydrogen ions supplied through the electrolyte membrane and the electrons delivered through the separator meet oxygen in the air supplied to the cathode by an air supply device, thereby creating a reaction of producing water. As a result of the movement of the hydrogen ions, the electrons flow through external conductive wires, and the electric current is generated as a result of the flow of the electrons.

Meanwhile, the electrolyte membrane of the membrane electrode assembly needs to be maintained at a predetermined humidity or higher so that the fuel cell stack 50 normally operates.

To this end, the air supplied along the air supply line 110 may pass through a humidifier 30, and the air to be supplied to the fuel cell stack 50 along the air supply line 110 may be humidified while passing through the humidifier 30. In this case, the humidification of air is defined as a process of increasing the humidity of the air.

For example, the humidifier 30 may be configured to humidify air (dry air) to be supplied to the fuel cell stack 50 using air (moist air) discharged from the fuel cell stack 50.

The humidifier 30 may have various structures capable of humidifying the dry air using the air (moist air) discharged from the fuel cell stack 50. The present disclosure is not restricted or limited by the structure of the humidifier 30.

According to the exemplary embodiment of the present disclosure, the humidifier 30 is disposed between the air compressor 20 and the fuel cell stack 50. The humidifier 30 may include an inflow gas supply port (not illustrated) through which inflow gas (dry air) is introduced (supplied), an inflow gas discharge port (not illustrated) through which the (humidified) inflow gas having passed through the interior of the humidifier 30 is discharged, a moist air supply port (not illustrated) through which moist air discharged from the fuel cell stack 50 is supplied, and a moist air discharge port (not illustrated) through which the moist air, which has humidified the inflow gas, is discharged to the outside.

The inflow gas supplied through the inflow gas supply port may be humidified by the moist air while passing through a humidification membrane (e.g., a hollow fiber membrane) (not illustrated) disposed in the humidifier 30. Then, the inflow gas may be supplied to the fuel cell stack 50 through the inflow gas discharge port.

Further, the moist air (or the condensate water) discharged from the fuel cell stack 50 may be supplied to the moist air supply port, humidify the inflow gas in the humidifier 30, and then be discharged to the outside through the moist air discharge port.

According to the exemplary embodiment of the present disclosure, the fuel cell system 10 may include an air control valve 40 configured to control the air entering and exiting the fuel cell stack 50 (the air to be introduced into the fuel cell stack and the air to be discharged from the fuel cell stack).

Various valves capable of selectively blocking the air entering and exiting the fuel cell stack 50 may be used as the air control valve 40. The present disclosure is not restricted or limited by the type and structure of the air control valve 40. For example, the air control valve 40 may include a first valve member (not illustrated) and a second valve member (not illustrated) that are configured to open or close a first port (not illustrated) through which the air is supplied to the fuel cell stack 50 and a second port (not illustrated) through which the air is discharged from the fuel cell stack 50.

The discharge line 120 is connected to the fuel cell stack 50 to discharge, to the outside, the exhaust gas EG (e.g., air and hydrogen) discharged from the fuel cell stack 50.

The discharge line 120 may have various structures capable of guiding the exhaust gas EG discharged from the fuel cell stack 50. The present disclosure is not restricted or limited by the structure of the discharge line 120.

For example, the exhaust gas EG discharged along the discharge line 120 may pass through the humidifier 30. The air (dry air) introduced into the humidifier 30 may be humidified by the exhaust gas EG (moist air contained in the exhaust gas) passing through the humidifier 30.

The discharge adapter 220 is configured to discharge, to the outside, the exhaust gas EG together with the air AG1 supplied to the fuel cell stack 50. The bypass line 130 connects the air supply line 110 and the discharge adapter 220 (the discharge line) and selectively allows the air AG1 to flow from the air supply line 110 to the discharge adapter 220.

This is to reduce the hydrogen concentration in the exhaust gas EG discharged through the discharge line 120.

That is, hydrogen may be contained in the exhaust gas EG discharged from the fuel cell stack 50 (e.g., the exhaust gas discharged during a purge process for adjusting a hydrogen concentration in the fuel cell stack). When a hydrogen concentration in the exhaust gas EG increases to a certain level or higher, the risk of explosion increases. Therefore, the hydrogen concentration in the exhaust gas EG discharged from the fuel cell needs to be maintained at a predetermined level or lower.

In the embodiment of the present disclosure, a part of the air AG1, which is to be supplied to the fuel cell stack 50 along the air supply line 110, is supplied to the discharge adapter 220 through the bypass line 130. Therefore, it is possible to obtain an advantageous effect of reducing the hydrogen concentration in the exhaust gas EG discharged through the discharge line 120.

Among other things, according to the embodiment of the present disclosure, the exhaust gas EG (e.g., hydrogen) discharged through the discharge line 120 and the air AG1 supplied through the bypass line 130 are mixed by the discharge adapter 220. Therefore, it is possible to obtain an advantageous effect of reducing the hydrogen concentration in the exhaust gas EG and reducing the risk of explosion even under a condition in which vehicle-induced wind cannot be used (e.g., in a state in which a construction machine is stationary).

The bypass line 130 may be connected in various manners in accordance with required conditions and design specifications. The present disclosure is not restricted or limited by the structure for connecting the bypass line 130.

For example, according to the exemplary embodiment of the present disclosure, the fuel cell system 10 may include a supply adapter 140 provided on the air compressor 20. The bypass line 130 may be connected to the air supply line 110 through the supply adapter 140.

According to another embodiment of the present disclosure, the bypass line may be connected directly to the air supply line without separately providing the supply adapter.

The supply adapter 140 may have various structures capable of being connected to the air compressor 20. The present disclosure is not restricted or limited by the structure and shape of the supply adapter 140.

For example, referring to FIG. 3, the supply adapter 140 may include a first supply port 142 communicating with the air supply line 110, and a second supply port 144 communicating with the bypass line 130.

For example, the first supply port 142 and the second supply port 144 may each have a straight shape. According to another embodiment of the present disclosure, the first supply port and the second supply port may each have a curved shape or other shapes.

Hereinafter, an example will be described in which the supply adapter 140 has three second supply ports 144 that communicate with the first supply port 142 and are disposed in an approximately 'T' shape.

For reference, FIG. 3 illustrates an example in which only two second supply ports 144, among the three second supply ports 144, are connected to the bypass lines 130. However, the bypass lines 130 may be substantially and respectively connected to the second supply ports. According to another embodiment of the present disclosure, the supply adapter may have two or less second supply ports or four or more second supply ports.

In particular, an on-off valve for selectively opening or closing the second supply port 144 may be integrally provided on a lateral portion of the supply adapter 140.

Various valve means capable of selectively opening or closing the second supply port 144 may be used as the on-off valve. The present disclosure is not restricted or limited by the type and structure of the on-off valve. For example, a typical solenoid valve, a butterfly valve, or the like may be used as the on-off valve.

With this configuration, in a state in which the on-off valve closes the second supply port 144, the air compressed by the air compressor 20 may be supplied to the fuel cell stack 50 through the first supply port 142. In contrast, in a state in which the on-off valve opens the second supply port 144, a part of the air compressed by the air compressor 20 is supplied to the fuel cell stack 50 through the first supply port 142, and another part AG1 of the air compressed by the air compressor 20 may be supplied to the bypass line 130 through the second supply port 144 (see FIG. 2).

The discharge adapter 220 may have various structures capable of discharging the air AG1 and the exhaust gas EG. The present disclosure is not restricted or limited by the structure of the discharge adapter 220.

Figure 4:
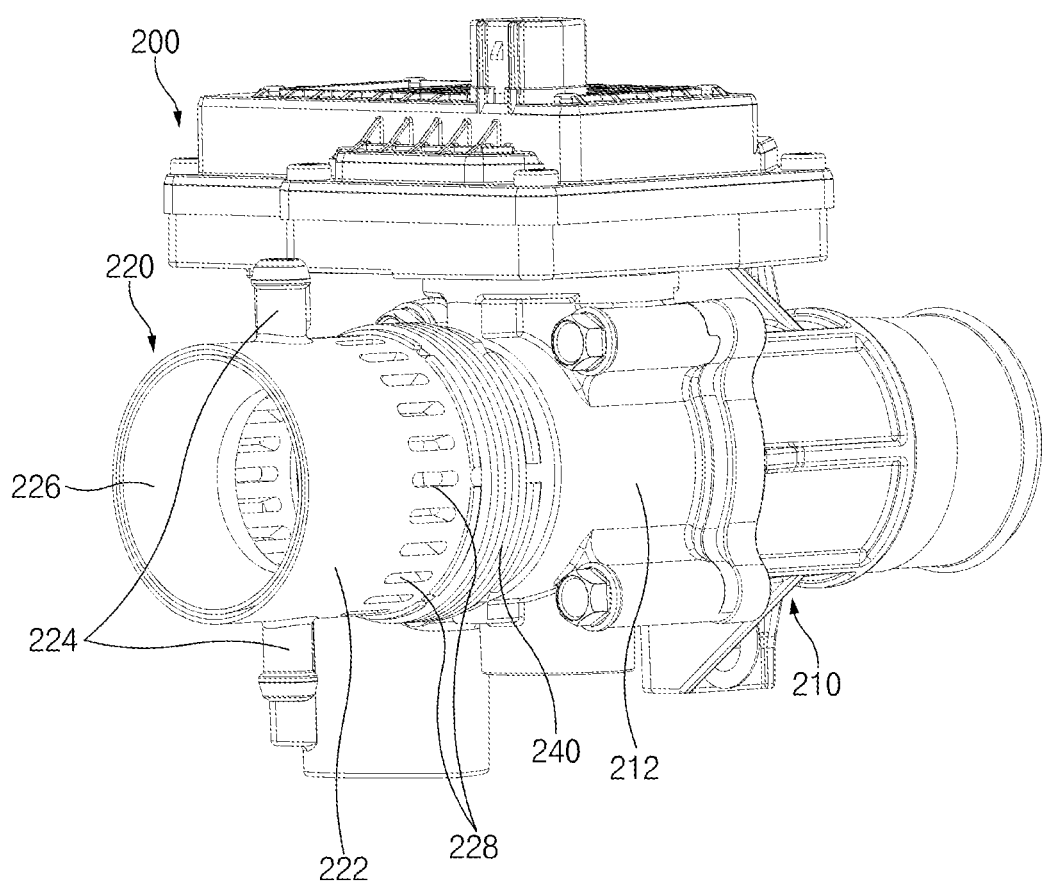
FIGS. 4 and 5 are views for explaining an exhaust gas treatment device of the fuel cell system according to the embodiment of the present disclosure.
Figure 5:
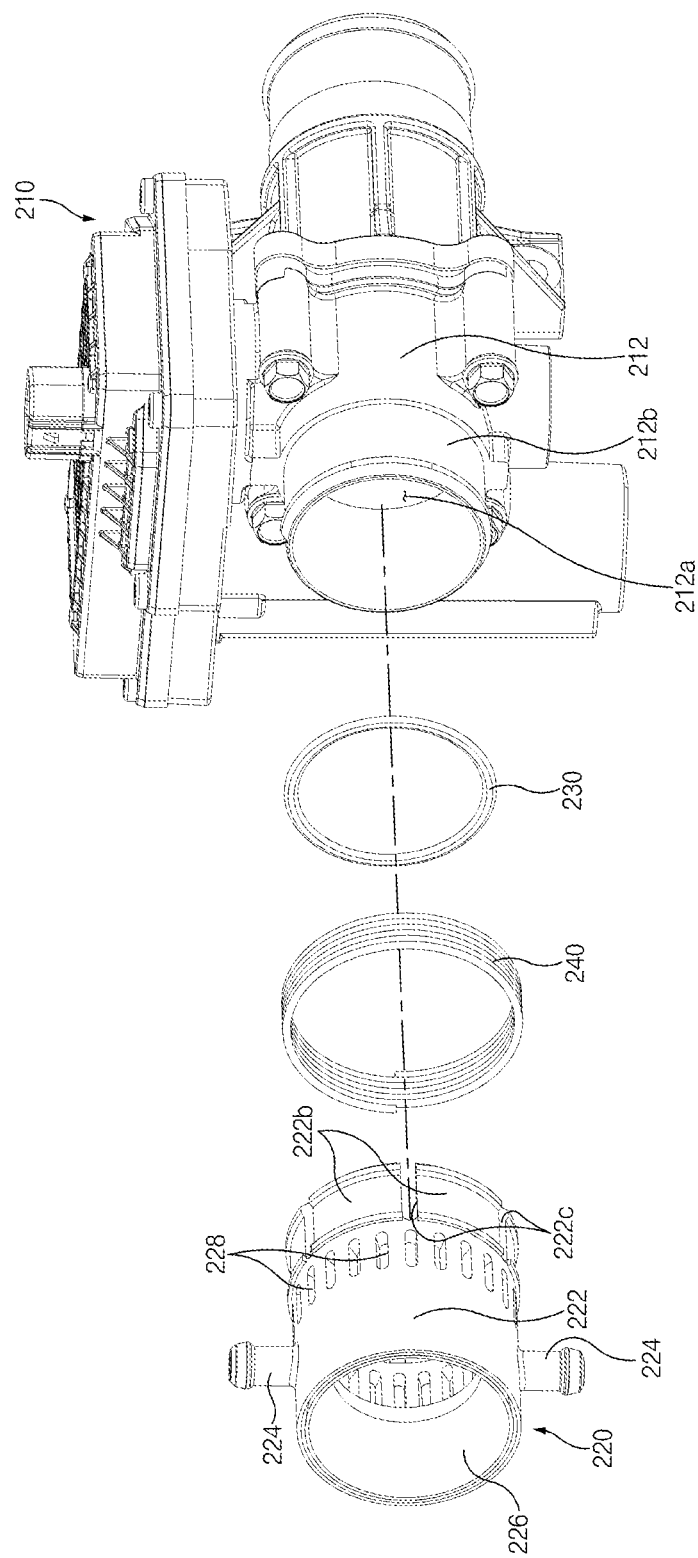
Figure 6:
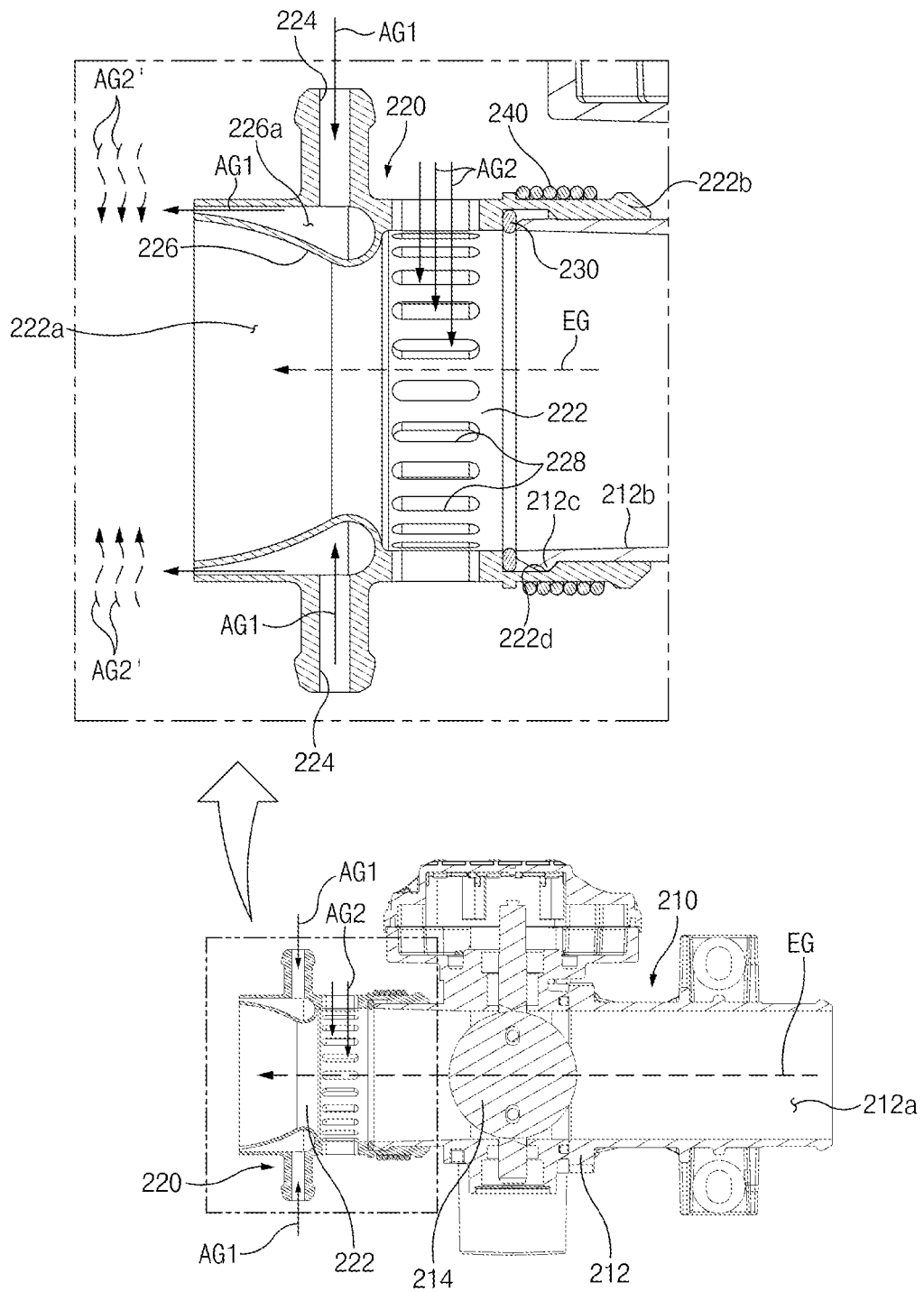
FIG. 6 is a view for explaining a discharge adapter of the fuel cell system according to the embodiment of the present disclosure.

For example, referring to FIGS. 4 to 6, the discharge adapter 220 may include an adapter body 222 having a discharge flow path 222a communicating with the discharge line 120, air inlet ports 224 provided in the adapter body 222 and connected to the bypass lines 130, and an adapter guide 226 provided in the adapter body 222 and configured to define an air injection flow path 226a separated from the discharge flow path 222a and communicating with the air inlet port 224.

Hereinafter, an example will be described in which the fuel cell system 10 includes the valve unit 210 connected to the discharge line 120 to selectively open or close the discharge line 120, and the discharge adapter 220 is connected to the valve unit 210. According to another embodiment of the present disclosure, the discharge adapter may be connected directly to the discharge line without the valve unit.

The valve unit 210 may have various structures capable of selectively opening or closing the discharge line 120. The present disclosure is not restricted or limited by the structure of the valve unit 210.

For example, the valve unit 210 may include a valve housing 212 having a valve flow path 212a communicating with the discharge line 120, and a valve member 214 configured to selectively open or close the valve flow path 212a.

For example, the valve housing 212 may have a hollow cylindrical shape and include the valve flow path 212a having an approximately straight shape.

A typical solenoid valve, a butterfly valve, or the like, capable of opening or closing the valve flow path 212a, may be used as the valve member 214. The present disclosure is not restricted or limited by the type and structure of the valve member 214.

With this configuration, in a state in which the valve member 214 opens the valve flow path 212a, the exhaust gas EG discharged from the fuel cell stack 50 may be discharged to the outside through the valve flow path 212a. In contrast, in a state in which the valve member 214 closes the valve flow path 212a, the discharge of the exhaust gas EG through the valve flow path 212a may be blocked.

The adapter body 222 may have various structures having the discharge flow path 222a communicating with the discharge line 120. The present disclosure is not restricted or limited by the structure and shape of the adapter body 222.

For example, the adapter body 222 may have a circular cross-section with an approximately hollow cylindrical shape, and an approximately straight discharge flow path 222a may be defined along the interior of the adapter body 222. According to another embodiment of the present disclosure, the adapter body may have a quadrangular cross-sectional shape or other cross-sectional shapes. Alternatively, the discharge flow path may have a curved shape or other shapes.

The air inlet port 224 is provided in the adapter body 222 and connected to (communicates with) the bypass line 130.

For example, the adapter body 222 may have two air inlet ports 224, and the bypass lines 130 may be respectively connected to the air inlet ports 224. According to another embodiment of the present disclosure, the adapter body may have a single air inlet port or three or more air inlet ports.

For example, the air inlet port 224 may be perpendicularly connected to the adapter body 222. The air AG1 introduced into the air inlet port 224 through the bypass line 130 may be discharged to the outside of the adapter body 222 through the air injection flow path 226a.

The adapter guide 226 is disposed outside the adapter body 222 to define the air injection flow path 226a separated from the discharge flow path 222a and communicating with the air inlet port 224.

The adapter guide 226 may have various structures capable of defining the air injection flow path 226a. The present disclosure is not restricted or limited by the structure and shape of the adapter guide 226.

For example, the adapter guide 226 may be disposed on an inner peripheral surface of the adapter body 222 and provided in the form of a continuous ring defined in a circumferential direction of the adapter body 222. The air injection flow path 226a is provided in the form of a continuous ring defined in the circumferential direction of the adapter body 222 and disposed to surround the entire periphery of the discharge flow path 222a.

In particular, an outlet of the discharge flow path 222a and an outlet of the air injection flow path 226a may be directed in the same direction. For example, the outlet of the discharge flow path 222a may be disposed at a distal end (a left end based on FIG. 6) of the adapter body 222. The outlet of the air injection flow path 226a may be disposed at a distal end (a left end based on FIG. 6) of the adapter guide 226 so as to be directed in the same direction as the outlet of the discharge flow path 222a.

As described above, according to the embodiment of the present disclosure, the adapter guide 226 has the discharge flow path 222a and the air injection flow path 226a, and the air AG1 (the air supplied through the bypass line) and the exhaust gas EG are discharged together through the adapter guide 226, such that the exhaust gas EG discharged through the discharge flow path 222a may be mixed with the air AG1 supplied through the bypass line 130. Therefore, it is possible to obtain an advantageous effect of reducing the hydrogen concentration in the exhaust gas EG.

More particularly, an outlet end of the discharge flow path 222a may be disposed at the distal end of the adapter body 222. An outlet end of the air injection flow path 226a may be disposed at the distal end of the adapter guide 226 and provided on the same line as the outlet end of the discharge flow path 222a.

In this case, the configuration in which the outlet end of the discharge flow path 222a (the left end of the discharge flow path based on FIG. 6) is provided on the same line as the outlet end of the air injection flow path 226a (the left end of the air injection flow path based on FIG. 6) may mean that a start point from which the exhaust gas EG is discharged through the discharge flow path 222a is identical to a start point from which the air AG1 is discharged through the air injection flow path 226a.

Since the outlet end of the discharge flow path 222a and the outlet end of the discharge flow path 222a are provided on the same line as described above, the exhaust gas EG may be discharged through the discharge flow path 222a and then immediately mixed with the air AG1 discharged through the air injection flow path 226a.

In the embodiment of the present disclosure illustrated and described above, the example has been described in which the adapter guide 226 is provided in the form of a continuous ring to surround the entire inner peripheral surface of the adapter body 222. However, according to another embodiment of the present disclosure, the adapter guide may partially surround a part of the inner peripheral surface of the adapter body.

According to the exemplary embodiment of the present disclosure, an inlet of the air inlet port 224 may have a first cross-sectional area, and the outlet of the air injection flow path 226a may have a second cross-sectional area smaller than the first cross-sectional area.

This is to increase a discharge velocity of the air AG1 discharged through the air injection flow path 226a and decrease a pressure in an outlet region of the air injection flow path 226a. In this case, the outlet region of the air injection flow path 226a may be understood as a region in which the air AG1 is injected through the outlet of the air injection flow path 226a (an outer region adjacent to the outlet of the air injection flow path).

In addition, according to the Bernoulli's theorem, it can be seen that a pressure of the fluid (air) decreases as the velocity (flow velocity) of the fluid (air) moving along the flow path (air injection flow path) increases. That is, according to the Bernoulli's theorem, it can be seen that when a flow rate Q of a fluid (air) supplied to a flow path (air injection flow path) is constant, a cross-sectional area of the flow path (air injection flow path) is inversely proportional to a velocity (flow velocity) of the fluid (air) moving along the flow path (air injection flow path).

As described above, according to the embodiment of the present disclosure, the cross-sectional area (e.g., A2) of the outlet of the air injection flow path 226a is smaller than the cross-sectional area (e.g., A1) of the inlet of the air inlet port 224 (A2<A1). Therefore, the discharge velocity (e.g., V2) of the air AG1 discharged through the air injection flow path 226a may be higher than an inflow velocity (e.g., V1) of the air introduced into the air inlet port 224 (V2>V1). As a result, a pressure (hereinafter, referred to as an 'external pressure') (e.g., P2) in the outlet region of the air injection flow path 226a may be lower than a pressure (hereinafter, referred to as an 'internal pressure') (e.g., P1) in the valve flow path 212a (P2<P1). For example, when the internal pressure of the valve flow path 212a (a discharge pressure of the exhaust gas) is a first pressure P1, the pressure in the outlet region of the air injection flow path 226a may be a second pressure P2 lower than the first pressure.

As a result, a pressure difference between the external pressure (the pressure in the outlet region of the air injection flow path) and the internal pressure (the internal pressure of the valve flow path) (the external pressure of the air injection flow path is lower than the internal pressure of the valve flow path) enables air AG2' adjacent to the periphery of the outlet of the air injection flow path 226a to enter (move to) the outlet region of the air injection flow path 226a where the pressure is relatively low.

Therefore, the air AG1 injected through the air injection flow path 226a and the air AG2' adjacent to the periphery of the outlet of the air injection flow path 226a may be mixed in the exhaust gas EG discharged through the discharge flow path 222a. Therefore, it is possible to obtain an advantageous effect of more effectively reducing the hydrogen concentration in the exhaust gas EG.

In particular, the air injection flow path 226a may have a cross-sectional area that gradually decreases from the inlet end to the outlet end.

For example, based on FIG. 6, the air injection flow path 226a may have a cross-sectional area that gradually decreases from the right end to the left end.

Since the air injection flow path 226a has a cross-sectional area that gradually decreases from the inlet end to the outlet end as described above, the velocity (flow velocity) of the air AG1 passing through the air injection flow path 226a may further increase. Therefore, it is possible to further increase the discharge velocity (e.g., V2) of the air AG1 discharged through the air injection flow path 226a (decrease the pressure in the outlet region of the air injection flow path).

More particularly, the air injection flow path 226a may have a streamlined cross-sectional shape.

As described above, according to the embodiment of the present disclosure, the air injection flow path 226a has a streamlined cross-sectional shape having a cross-sectional area that gradually decreases from the inlet end to the outlet end. Therefore, the velocity of the air AG1 passing through the air injection flow path 226a may gradually increase, and the pressure in the outlet region of the air injection flow path 226a may more effectively decrease. As a result, it is possible to obtain an advantageous effect of maximizing the inflow amount of air AG2' to be introduced into the exhaust gas EG at the periphery of the outlet of the air injection flow path 226a (the exhaust gas discharged through the discharge flow path).

According to the exemplary embodiment of the present disclosure, the fuel cell system 10 may include inlet holes 228 provided in the adapter body 222 and configured to communicate with the discharge flow path 222a and allow air AG2 outside of the adapter body 222 to be introduced into the adapter body 222.

For example, the inlet holes 228 may be provided in the adapter body 222 and disposed between the air inlet port 224 and the inlet end (the right end based on FIG. 6) of the discharge flow path 222a.

According to another embodiment of the present disclosure, the inlet hole may be provided in the air inlet port of the outlet end of the discharge flow path or positioned at other positions.

The inlet hole 228 may have various structures capable of allowing the outside air AG2 of the adapter body 222 (the air outside the outer peripheral surface of the adapter body) to be introduced thereinto. The present disclosure is not restricted or limited by the structure and shape of the inlet hole 228.

For example, the inlet hole 228 may be provided in the form of a long hole with a length longer than a width thereof. Alternatively, the inlet hole 228 may be provided in the form of a circular hole, a quadrangular hole, or the like.

As described above, according to the embodiment of the present disclosure, the inlet holes 228 are provided in the adapter body 222, and the air AG2 outside the adapter body 222 is introduced (drawn) into the adapter body 222 (the discharge flow path) through the inlet holes 228 before the exhaust gas EG is discharged to the outside of the adapter body 222. Therefore, it is possible to obtain an advantageous effect of more effectively reducing the hydrogen concentration in the exhaust gas EG finally discharged through the discharge flow path 222a.

In particular, the inlet hole 228 may be provided in plural, and the plurality of inlet holes 228 may be spaced apart from one another at uniform intervals in the circumferential direction of the adapter body 222. Since the plurality of inlet holes 228 is spaced apart from one another at uniform intervals in the circumferential direction of the adapter body 222 as described above, the air AG2 may be uniformly introduced into the adapter body 222 in the circumferential direction of the adapter body 222. Therefore, it is possible to obtain an advantageous effect of further improving efficiency in mixing the exhaust gas EG and the air AG2.

According to the exemplary embodiment of the present disclosure, the fuel cell system 10 may include a sealing member 230 interposed between the valve housing 212 and the discharge adapter 220.

The sealing member 230 may have various structures capable of sealing a gap between the valve housing 212 and the discharge adapter 220. The present disclosure is not restricted or limited by the structure of the sealing member 230.

For example, the sealing member 230 may have an approximately ring shape and be interposed between the valve housing 212 and the discharge adapter 220.

The sealing member 230 may be made of an elastic material such as silicone or urethane. The present disclosure is not restricted or limited by the material and properties of the sealing member 230.

Since the sealing member 230 is provided between the valve housing 212 and the discharge adapter 220 as described above, it is possible to obtain an advantageous effect of minimizing leakage of the exhaust gas EG through the gap between the valve housing 212 and the discharge adapter 220 and improving safety and reliability.

Meanwhile, the structure for coupling the valve unit 210 and the discharge adapter 220 may be variously changed in accordance with required conditions and design specifications. The present disclosure is not restricted or limited by the structure for coupling the valve unit 210 and the discharge adapter 220.

For example, referring to FIG. 5, according to the exemplary embodiment of the present disclosure, the fuel cell system 10 may include: a fastening flap 222b extending from an end of the discharge adapter 220 and disposed to surround an outer peripheral surface of an outlet port 212b of the valve housing 212; and a clamp member 240 configured to lock the fastening flap 222b to the outlet port 212b.

The fastening flap 222b may have various structures capable of surrounding the outer peripheral surface of the outlet port 212b of the valve housing 212. The present disclosure is not restricted or limited by the structure of the fastening flap 222b.

For example, the fastening flap 222b may extend from the end of the discharge adapter 220 and have an inner peripheral surface that may come into close contact with the outer peripheral surface of the valve housing 212.

In particular, according to the exemplary embodiment of the present disclosure, the fuel cell system 10 may include a cut-out slit 222c provided in the fastening flap 222b.

The cut-out slit 222c may have various structures in accordance with required conditions and design specifications. The present disclosure is not restricted or limited by the structure and shape of the cut-out slit 222c.

For example, the cut-out slit 222c may be provided by removing (cutting) a part of the fastening flap 222b in the longitudinal direction of the discharge adapter 220. The cut-out slit 222c may be provided in plural, and the plurality of cut-out slits 222c may be spaced apart from one another in the circumferential direction of the discharge adapter 220.

According to another embodiment of the present disclosure, the cut-out slit may be provided in the fastening flap in another direction. Alternatively, the cut-out slit may have a curved shape such as an 'S' shape or a 'C' shape.

As described above, according to the embodiment of the present disclosure, the cut-out slit 222c is provided in the fastening flap 222b. Therefore, the cut-out slit 222c may improve dynamic properties of the fastening flap 222b relative to the discharge adapter 220 (the properties that enable the fastening flap to move relative to the discharge adapter in the radial direction of the discharge adapter based on one end of the fastening flap connected to the discharge adapter).

The clamp member 240 may have various structures capable of locking the fastening flap 222b to the outlet port 212b of the valve housing 212. The present disclosure is not restricted or limited by the structure of the clamp member 240.

For example, the clamp member 240 may be made by winding a metal wire in the form of a coil (e.g., in the form of a coil spring).

According to another embodiment of the present disclosure, the clamp member may be configured by assembling a plurality of clamp bands each having a circular arc shape.

In particular, the fuel cell system 10 may include a catching protrusion 212c protruding from an outer peripheral surface of the outlet port 212b, and a catching groove 222d provided in an inner peripheral surface of the fastening flap 222b and configured to accommodate the catching protrusion 212c.

The catching protrusion 212c provided on the outer peripheral surface of the outlet port 212b is accommodated in the catching groove 222d provided in the inner peripheral surface of the fastening flap 222b when the fastening flap 222b is disposed to surround the outer peripheral surface of the outlet port 212b of the valve housing 212 as described above. Therefore, it is possible to obtain an advantageous effect of stably maintaining an assembled state of the fastening flap 222b (a state in which the fastening flap is disposed to surround the outer peripheral surface of the outlet port of the valve housing) and inhibiting the discharge adapter 220 from separating from the valve housing 212.

Figure 7:
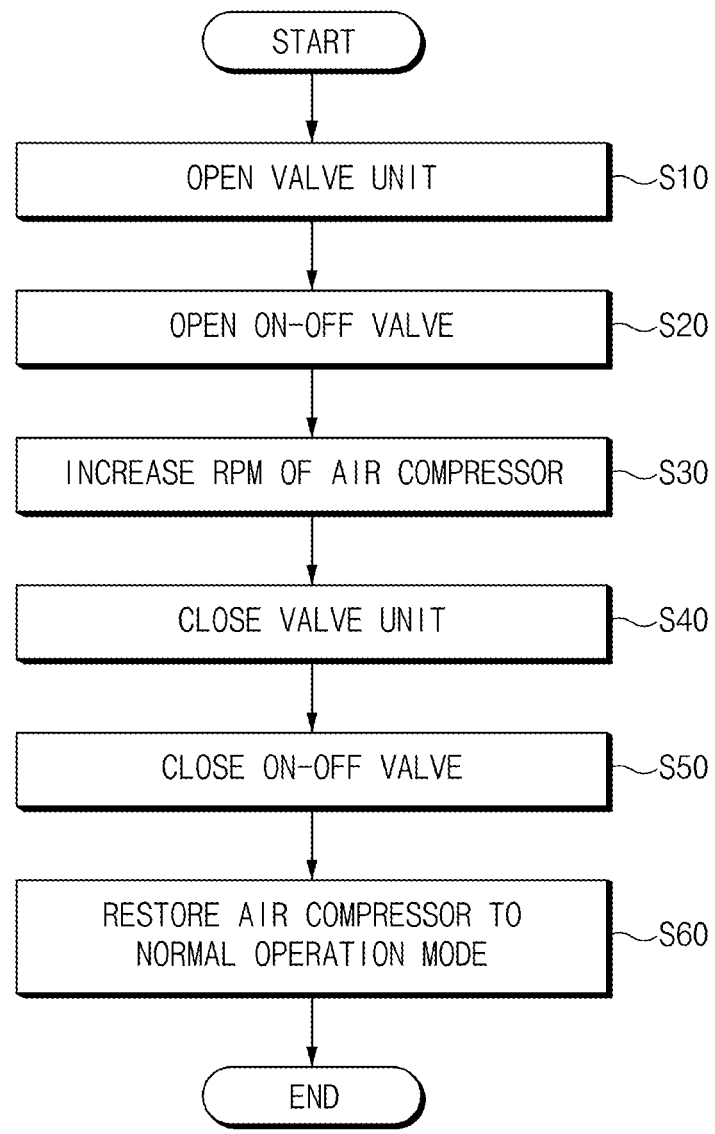
FIG. 7 is a block diagram for explaining a method of controlling the fuel cell system according to the embodiment of the present disclosure.

Meanwhile, FIG. 7 is a block diagram for explaining a method of controlling the fuel cell system according to the embodiment of the present disclosure. Further, the parts identical and equivalent to the parts in the above-mentioned configuration will be designated by the identical or equivalent reference numerals, and detailed descriptions thereof will be omitted.

Referring to FIG. 7, according to the exemplary embodiment of the present disclosure, the method of controlling the fuel cell system 10 may include a step S10 of opening the valve unit 210, a step S20 of opening the on-off valve, a step S30 of increasing a rotational speed (RPM) of the air compressor 20, a step S40 of closing the valve unit 210, a step S50 of closing the on-off valve, and a step S60 of restoring the air compressor 20 to a normal operation mode.

First, when it is determined that a hydrogen concentration in the exhaust gas EG discharged to the outside is higher than a preset reference concentration, the valve unit 210 is opened (the valve flow path is opened), and the on-off valve is opened. As a result, a part of the air compressed by the air compressor 20 may be supplied to the fuel cell stack 50, and another part of the air compressed by the air compressor 20 may be supplied to the bypass line 130.

After the valve unit 210 and the on-off valve are opened, the air compressor 20 performs a supercharging operation by increasing the RPM of the air compressor 20 (e.g., revolutions per minute of the rotor) by corresponding to a flow rate of the air flowing through the bypass line 130. Since the RPM of the air compressor 20 is increased in the state in which the valve unit 210 and the on-off valve are opened as described above, a sufficient amount of air may be supplied to the fuel cell stack 50 (an amount of air required for the normal operation of the fuel cell stack may be supplied) even under the condition in which the air AG1 is supplied through the bypass line 130.

Thereafter, when it is determined that the hydrogen concentration in the exhaust gas EG is lower than the preset reference concentration, the valve unit 210 and the on-off valve may be closed, and the air compressor 20 may be restored to the normal operation mode (the RPM of the air compressor may be decreased).

While the embodiments have been described above, the embodiments are just illustrative and not intended to limit the present disclosure. It can be appreciated by those skilled in the art that various modifications and applications, which are not described above, may be made to the present embodiment without departing from the intrinsic features of the present embodiment. For example, the respective constituent elements specifically described in the embodiments may be modified and then carried out. Further, it should be interpreted that the differences related to the modifications and applications are included in the scope of the present disclosure defined by the appended claims.

What is claimed is:

1. A fuel cell system comprising:
    an air supply line configured to supply air through a humidifier to a fuel cell stack;
    a discharge line connected to the humidifier and configured to guide an exhaust gas discharged from the fuel cell stack through the humidifier;
    a discharge adapter connected to the discharge line and configured to discharge the exhaust gas to an outside of the fuel cell system; and
    a bypass line having one end connected to the air supply line and another end connected to the discharge adapter, the bypass line being configured to selectively allow the air to flow from the air supply line to the discharge adapter,
    wherein the discharge adapter comprises:
        an adapter body having a discharge flow path communicating with the discharge line;
        an air inlet port provided in the adapter body and connected to the bypass line; and
        an adapter guide disposed on the adapter body and configured to define an air injection flow path separated from the discharge flow path and communicating with the air inlet port.

2. The fuel cell system of claim 1, wherein an outlet of the discharge flow path and an outlet of the air injection flow path are directed in the same direction.

3. The fuel cell system of claim 1, wherein an inlet of the air inlet port has a first cross-sectional area, and an outlet of the air injection flow path has a second cross-sectional area smaller than the first cross-sectional area.

4. The fuel cell system of claim 1, wherein the air injection flow path has a cross-sectional area that decreases from an inlet end to an outlet end of the air injection flow path.

5. The fuel cell system of claim 4, wherein the air injection flow path has a streamlined cross-sectional shape having a cross-sectional area that decreases from the inlet end to the outlet end.

6. The fuel cell system of claim 1, wherein the adapter guide is provided in the form of a continuous ring in a circumferential direction of the adapter body, and the air injection flow path is provided in the form of a continuous ring in the circumferential direction of the adapter body.

7. The fuel cell system of claim 1, comprising:
    an inlet hole provided in the adapter body and configured to communicate with the discharge flow path and allow air outside the adapter body to be introduced thereinto.

8. The fuel cell system of claim 7, wherein the inlet hole is provided in plural, and the plurality of inlet holes are spaced apart from one another in a circumferential direction of the adapter body.

9. The fuel cell system of claim 1, comprising:
    a valve unit connected to the discharge line and configured to selectively open or close the discharge line,
    wherein the discharge adapter is connected to the valve unit.

10. The fuel cell system of claim 9, wherein the valve unit comprises:
    a valve housing having a valve flow path communicating with the discharge line; and
    a valve member configured to selectively open or close the valve flow path.

11. The fuel cell system of claim 10, comprising:
    a sealing member interposed between the valve housing and the discharge adapter.

12. A fuel cell system comprising:
    an air supply line configured to supply air through a humidifier to a fuel cell stack;
    a discharge line connected to the humidifier and configured to guide an exhaust gas discharged from the fuel cell stack through the humidifier;
    a discharge adapter connected to the discharge line and configured to discharge the exhaust gas to an outside of the fuel cell system;
    a bypass line having one end connected to the air supply line and another end connected to the discharge adapter, the bypass line being configured to selectively allow the air to flow from the air supply line to the discharge adapter; and
    a valve unit connected to the discharge line and configured to selectively open or close the discharge line,
    wherein the discharge adapter is connected to the valve unit,
    the valve unit comprises:
        a valve housing having a valve flow path communicating with the discharge line; and
        a valve member configured to selectively open or close the valve flow path, and the fuel cell system further comprises:

a fastening flap extending from an end of the discharge adapter and disposed to surround an outer peripheral surface of an outlet port of the valve housing; and a clamp member configured to lock the fastening flap to the outlet port.

13. The fuel cell system of claim 12, comprising:

a cut-out slit provided in the fastening flap.

14. The fuel cell system of claim 12, comprising:

a catching protrusion provided on the outer peripheral surface of the outlet port; and a catching groove provided in an inner peripheral surface of the fastening flap and configured to accommodate the catching protrusion.

15. The fuel cell system of claim 1, comprising:

an air compressor connected to the air supply line and configured to compress the air supplied by the air supply line.

16. An exhaust gas treatment device comprising:

a valve unit disposed in a discharge line for discharging an exhaust gas, discharged from a fuel cell stack, through a humidifier, and configured to selectively open or close the discharge line; and a discharge adapter connected to the valve unit and configured to discharge, to an outside of the exhaust gas treatment device, the exhaust gas together with air to be supplied to the fuel cell stack, wherein the discharge adapter comprises:

an adapter body having a discharge flow path communicating with the discharge line:

an air inlet port provided in the adapter body and configured to allow the air to be introduced thereinto; and an adapter guide disposed on the adapter body and configured to define an air injection flow path separated from the discharge flow path and communicating with the air inlet port.

17. The exhaust gas treatment device of claim 16, wherein the valve unit comprises:

a valve housing having a valve flow path communicating with the discharge line; and a valve member configured to selectively open or close the valve flow path.

18. The exhaust gas treatment device of claim 16, comprising:

an inlet hole provided in the adapter body and configured to communicate with the discharge flow path and allow air outside the adapter body to be introduced thereinto.

* * * * *